Patented Dec. 23, 1941

2,266,940

UNITED STATES PATENT OFFICE 2,266,940

LAMINATED CLOTH

Waldorf S. Traylor, Silview, Del., assignor to Hercules Powder Company, Wilmington, Del., a corporation of Delaware No Drawing. Application February 25, 1938, Serial No. 192,583

10 Claims. (Cl. 154—46)

This invention relates to articles of laminated cloth, such as, for example, shirt collars, shirt fronts, dress shirt bosoms, and the like, and to methods of producing such articles.

It has heretofore been known to produce laminated cloth articles of this type by joining an outer, finely woven cloth to a relatively coarse base fabric by means of some adhesive or bonding material, usually a layer or sheet of thermoplastic, such as, for example, nitrocellulose, cellulose acetate, various synthetic resins, etc. These laminated cloth articles are designed to possess the property of retaining permanently a stiffened or starched appearance despite repeated laundering, and without the subsequent use of starch or other stiffening material.

Such laminated cloth articles as heretofore produced, however, have not been entirely satisfactory for various reasons. A common difficulty encountered when using cellulose acetate or nitrocellulose as a bonding material was the destruction of adhesion and resiliency of the bonding material upon repeated laundering, particularly in the presence of small amounts of alkali, with consequent separation of the layers of fabric. Other bonding materials show a tendency to "bleed" through the outer layer of cloth and so discolor and spoil the article.

Now, in accordance with this invention there is provided a laminated cloth article which will not lose its resiliency or the adhesion between its laminations on repeated launderings, even in the presence of alkali, and which has no tendency to discolor through a "bleeding" of the bonding material. Furthermore, there is provided a laminated cloth article which is bonded by pressing at an elevated temperature, without the use of volatile solvent, and which is rebonded by ordinary ironing at any time the bond should become defective in service.

The laminated article in accordance with this invention will comprise a plurality of layers of cloth, of any desired type, adhered and bonded together by means of a thermoplastic material comprising essentially a water-insoluble alkyl ether of cellulose such as, for example, ethyl cellulose, propyl cellulose, etc., and a water-insoluble waxy material. Ethyl cellulose will be found to be particularly desirable for use in this thermoplastic bonding material which I prefer to use. The cellulose ether chosen will desirably be etherified to the extent such that it is soluble in organic solvents. Thus, for example, I prefer to use an ethyl cellulose having an ethoxy content within the range of about 46% to about 50%, by weight.

Water-insoluble, waxy materials for use in the thermoplastic bonding composition are, for example, the true waxes as montan wax, beeswax, candellila wax, carnauba wax, Japan wax, etc., paraffin wax, preferably of high melting point, chlorinated paraffin, chlorinated diphenyl, stearyl alcohol, etc.

The bonding composition which I utilize may also contain alkali-resistant plasticizers, such as, for example, hydrogenated methyl abietate, hydrogenated ethyl abietate, dibutyl phthalate, etc. It may also contain alkali-resistant resins as, for example, cumarone-indene resins, polymerized cyclo ketones, etc., to increase the stiffness of the composition and suitable pigments to match the color of the bonding material to the color of the cloth.

All of these are ingredients which may be added within such limits that the bonding material produced will soften under the heat used in consolidation, but will not become so fluid as to run through the cloth. I have found that the bonding composition will desirably have a softening point within the range of about 105° C. to about 200° C.

The preferred embodiment of my invention will comprise a plurality of layers of cloth of any desired type, adhered and bonded together by means of a thermoplastic material comprising essentially ethyl cellulose and a water-insoluble, wax-like material. The preferred proportions of ethyl cellulose and the wax-like material will depend upon which solvent action the wax-like material has on ethyl cellulose. In general, it will be found, however, that the waxy material may comprise from about 5% to about 35% by weight of the ethyl cellulose-waxy material composition, and will desirably comprise about 10% to about 25% of the composition.

In the practical adaptation of this invention, the laminations of cloth, one or both of which may be coated with the cellulose ether bonding material, or which may have positioned between them a sheet of such bonding material, are united under heat and pressure to form the laminated article. The sheet of bonding material may be a continuous film of the cellulose ether composition or it may be a cloth woven from threads of the cellulose ether adhesive. When a woven cloth is used as the bonding layer, such may be made entirely of threads of cellulose ether or it may be made of cellulose ether threads alternated with other textile threads such as cotton, wool, rayon, etc.

The bonding composition, which will comprise a water-immiscible alkyl cellulose ether and a waxy material, and may include plasticizers, resins, pigments, etc., may be applied to either or both of the cloth laminations in the form of a solution in a volatile solvent, as for example, a toluol-ethyl alcohol mixture, or in the form of an aqueous emulsion of a water-immiscible solution in a volatile solvent. Preferably, the bonding composition will be applied only to the coarser or base layer of cloth. While even comparatively small quantities of bonding material will produce a certain degree of adhesion, the cloth should preferably be coated with not less than 0.10 lb. per sq. yd., dry weight of bonding composition for each bond. A coating of 0.12 lb. per sq. yd., for example, will be found very satisfactory. For the production of an interlined cloth two bonds are required, so the amount of adhesive required will be doubled.

Alternately, the bonding composition may be woven into a cloth by methods well known to the art, placed between the layers of cloth to be laminated, prior to the laminating operation. Again, it may be formed into a sheet by any well known method, as for example, by casting from solution, extrusion, etc., and the film placed between the layers of cloth prior to the consolidating operation, or the adhesive composition may be applied to the cloth to be bonded by means of heat. The film or sheet of bonding material used in this way will desirably have a thickness of not less than 0.001 inch, and preferably a thickness of about 0.002 inch.

Whether the bonding composition has been applied as a coating to the layers of cloth or whether it is used in the form of a sheet or film, the uniting and consolidation of the layers of cloth will be affected by applying heat and pressure by known methods, as with, for example, heated pressing irons, heated pressure rolls, etc. The temperature of the pressing means may be varied from the lowest at which softening takes place, about 90–125° C., depending on the adhesive, to that at which decomposition of the adhesive will occur, which temperture will, of course, vary with the time of pressing and the thickness of the adhesive layer, etc. A temperature within the range of about 90° C. to about 155° C. is usually satisfactory, and, generally, I prefer to use a temperature within the range of about 125° C. to about 145° C. The time of pressing will likewise depend upon the temperature. Thus, for example, at 125° C. two minutes' pressing will barely give adhesion, while at 155° C. one minute represents the maximum time of pressing possible without decomposition. The pressure used may be varied widely, but a range of 100–300 lbs./sq. in. represents a practical operating range.

As an example of an adhesive composition for use in laminating fabrics in accordance with this invention, the following may be cited:

| | Parts by weight |
|---|---|
| Ethyl cellulose | 100 |
| Purified Montan wax | 30 |
| Toluol | 312 |
| Ethyl alcohol | 78 |

This composition may be used for coating films to be placed between the layers of cloth to be laminated, or may be applied directly to the cloth. It will be appreciated that the toluol and ethyl alcohol evaporate, leaving a thermoplastic bonding composition of ethyl cellulose-montan wax. While the proportions given are preferred, the ratio of ethyl cellulose to montan wax may be varied over the range of about 4:3 to about 5:1.

Further examples of adhesive compositions for use in laminating fabrics are summarized in the following table, in parts by weight.

Table I.

| | Example No. | | | | | | |
|---|---|---|---|---|---|---|---|
| | 2 | 3 | 4 | 5 | 6 | 7 | 8 |
| Ethyl cellulose | 95 | 90 | 80 | 66⅔ | 90 | 80 | 90 |
| Stenol | 5 | | | | | | |
| Chlorinated paraffin | | 10 | 20 | 33⅓ | | | |
| Paraffin wax (M. P. 70° C.) | | | | | 10 | | |
| Montan wax (purified) | | | | | | 20 | |
| Beeswax | | | | | | | 10 |
| Solvent {80 toluol / 20 butanol} | 380 | 360 | 320 | 266.6 | 360 | 320 | 360 |

Stenol is the term applied to the alcohols obtained by the reduction of the acids derived from sperm oil.

When applied directly to the cloth to be bonded, the above compositions will preferably be applied so that at least 1½ ounces of the solid plastic composition is deposited per square yard of cloth. With this particular composition it is preferred to coat a cheese cloth interliner with 3 to 5 ounces of this composition (dry weight) which is then placed between the layers of fabric to be bonded, thus producing two bonds. The stiffness of the laminated fabric produced may be varied, by varying the amount of the composition applied and the ratio of ethyl cellulose to montan wax.

What I claim and desire to protect by Letters Patent is:

1. A substantially permanently stiffened, laundering-resistant laminated cloth article of the character of shirt collars, shirt cuffs, dress shirt bosoms and the like which are designed for wearing apparel and require laundering after use, comprising a plurality of layers of launderable cloth fabric adhesively united by means of a thermoplastic, non-bleeding bonding composition in a quantity giving substantial stiffness and resilience to the laminated article, said bonding composition including ethyl cellulose of the type soluble in organic solvents and a water-insoluble waxy material, the waxy material being present in amount within the range of about 5% to about 35% by weight of the composition.

2. A substantially permanently stiffened, laundering-resistant laminated cloth article of the character of shirt collars, shirt cuffs, dress shirt bosoms and the like which are designed for wearing apparel and require laundering after use, comprising a plurality of layers of launderable cloth fabric adhesively united by means of a thermoplastic, non-bleeding bonding composition in a quantity giving substantial stiffness and resilience to the laminated article, said bonding composition including ethyl cellulose of the type soluble in organic solvents and a wax, the wax being present in amount within the range of about 5% to about 35% by weight of the composition.

3. A substantially permanently stiffened, laundering-resistant laminated cloth article of the character of shirt collars, shirt cuffs, dress shirt bosoms and the like which are designed for wearing apparel and require laundering after use, comprising a plurality of layers of launderable cloth fabric adhesively united by means of a thermoplastic, non-bleeding bonding composition in a quantity giving substantial stiffness and resilience to the laminated article, said bonding composition including ethyl cellulose of the type soluble in organic solvents and montan wax, the montan wax being present in amount within the range of about 5% to about 35% by weight of the composition.

4. A substantially permanently stiffened, laundering-resistant laminated cloth article of the character of shirt collars, shirt cuffs, dress shirt bosoms and the like which are designed for wearing apparel and require laundering after use, comprising a plurality of layers of launderable cloth fabric adhesively united by means of a thermoplastic, non-bleeding bonding composition in a quantity giving substantial stiffness and resilience to the laminated article, said bonding composition including ethyl cellulose of the type soluble in organic solvents and a paraffin wax, the paraffin wax being present in amount within the range of about 5% to about 35% by weight of the composition.

5. A substantially permanently stiffened, laundering-resistant laminated cloth article of the character of shirt collars, shirt cuffs, dress shirt bosoms and the like which are designed for wearing apparel and require laundering after use, comprising a plurality of layers of launderable cloth fabric adhesively united by means of a thermoplastic, non-bleeding bonding composition in a quantity giving substantial stiffness and resilience to the laminated article, said bonding composition including ethyl cellulose of the type soluble in organic solvents and beeswax, the beeswax being present in amount within the range of about 5% to about 35% by weight of the composition.

6. A substantially permanently stiffened laundering-resistant laminated cloth article of the character of shirt collars, shirt cuffs, dress shirt bosoms and the like which are designed for wearing apparel and require laundering after use, comprising an outer launderable cloth fabric and a launderable base fabric in which are woven threads of an adhesive material comprising ethyl cellulose of the type soluble in organic solvents and a water-insoluble waxy material, the waxy material being present in amount within the range of about 5% to about 35% by weight of the adhesive material, the said fabrics being adhered together by the threads of adhesive material.

7. A substantially permanently stiffened laundering-resistant laminated cloth article of the character of shirt collars, shirt cuffs, dress shirt bosoms and the like which are designed for wearing apparel and require laundering after use, comprising an outer launderable cloth fabric and a launderable base fabric in which are woven threads of an adhesive material comprising ethyl cellulose of the type soluble in organic solvents and a wax, the wax being present in amount within the range of about 5% to about 35% by weight of the adhesive material, the said fabrics being adhered together by the threads of adhesive material.

8. A substantially permanently stiffened laundering-resistant laminated cloth article of the character of shirt collars, shirt cuffs, dress shirt bosoms and the like which are designed for wearing apparel and require laundering after use, comprising an outer launderable cloth fabric and a launderable base fabric in which are woven threads of an adhesive material comprising ethyl cellulose of the type soluble in organic solvents and montan wax, the montan wax being present in amount within the range of about 5% to about 35% by weight of the adhesive material, the said fabrics being adhered together by the threads of adhesive material.

9. A substantially permanently stiffened laundering-resistant laminated cloth article of the character of shirt collars, shirt cuffs, dress shirt bosoms and the like which are designed for wearing apparel and require laundering after use, comprising an outer launderable cloth fabric and a launderable base fabric in which are woven threads of an adhesive material comprising ethyl cellulose of the type soluble in organic solvents and a paraffin wax, the paraffin wax being present in amount within the range of about 5% to about 35% by weight of the adhesive material, the said fabrics being adhered together by the threads of adhesive material.

10. A substantially permanently stiffened laundering-resistant laminated cloth article of the character of shirt collars, shirt cuffs, dress shirt bosoms and the like which are designed for wearing apparel and require laundering after use, comprising an outer launderable cloth fabric and a launderable base fabric in which are woven threads of an adhesive material comprising ethyl cellulose of the type soluble in organic solvents and beeswax, the beeswax being present in amount within the range of about 5% to about 35% by weight of the adhesive material, the said fabrics being adhered together by the threads of adhesive material.

WALDORF S. TRAYLOR.